United States Patent [19]

Cosic

[11] 4,455,779
[45] Jun. 26, 1984

[54] FISHING ROD HOLDER APPARATUS

[76] Inventor: Ivan Cosic, 1685 No. Cass St., Milwaukee, Wis. 53202

[21] Appl. No.: 476,918

[22] Filed: Mar. 21, 1983

Related U.S. Application Data

[63] Continuation of Ser. No. 207,906, Nov. 18, 1980, abandoned.

[51] Int. Cl.³ ............................................. A01K 97/12
[52] U.S. Cl. ......................................... 43/17; 43/21.2
[58] Field of Search .................... 43/17, 16, 21.2, 17.5

[56] References Cited

U.S. PATENT DOCUMENTS

| | | | |
|---|---|---|---|
| 2,720,048 | 11/1955 | Bracey | 43/17 |
| 3,473,250 | 11/1969 | Leckell | 43/17 |
| 3,646,697 | 3/1972 | Jennings | 43/17 |
| 3,707,801 | 1/1973 | Gednalske | 43/17 |
| 3,713,131 | 1/1973 | Marshall | 43/17 |
| 4,142,316 | 3/1979 | Greer | 43/17 |
| 4,154,015 | 5/1979 | Holland | 43/17 |
| 4,202,125 | 5/1980 | Kovacs | 43/17 |
| 4,217,720 | 8/1980 | Karr | 43/17 |

FOREIGN PATENT DOCUMENTS 2453690  5/1976  Fed. Rep. of Germany ........ 43/17

Primary Examiner—Gene P. Crosby
Attorney, Agent, or Firm—Andrus, Sceales, Starke & Sawall

[57] ABSTRACT

A fishing rod holder includes an outer cup-shaped plastic body of a generally rectangular configuration and having an internal separation wall defining an alert chamber to one side and a support chamber to the opposite side. A fish rod socket is located within the support chamber with a molded leaf spring member connected to the socket and body to provide a leaf spring mounting of the socket. A contact arm is secured to the support member and extends laterally toward the separation wall into operative coupling to at least one of a pair of contact members within the support chamber. A mounting stake or clamp is removably coupled to the support body such as by a slotted connection. The alert chamber has a reduced width and length to correspond to a usual dry cell battery with inclined interconnecting integral molded walls providing a compact, esthetically pleasing outer housing. A battery and coil spring contact is located within the alert chamber. The outer end of the alert chamber is sealed by a cap and lamp having a contact engaging the battery. A contact strip extends from the cap into the support chamber with a depending arm. An arm on the socket engages a contact arm and closes the contacts when the fish pivots the socket.

10 Claims, 3 Drawing Figures

FISHING ROD HOLDER APPARATUS

This is a continuation of application Ser. No. 06/207,906, filed Nov. 18, 1980, now abandoned.

BACKGROUND OF THE PRESENT INVENTION

This invention relates to a fishing rod holder and particularly to a fishing rod holder having means for signaling a bite or strike on the fishing line.

The sport of fishing may involve casting or still fishing wherein the fishing line is cast out and the line and hook allowed to remain stationary until such time as a fish strikes the hook, at which time the fishing line is reeled in. In such still fishing, the fisherman often desires to attend to other matters or just relax. Various fishing rod holders have been suggested for supporting of the fishing rod with the cast line in place and having a device provided signal means operative in response to a strike such that the fisherman does not even have to continuously attend to the fishing rod. A typical fishing rod holder with an integrated signaling device is shown, for example, in U.S. Pat. No. 3,646,697 wherein a tubular rod socket is mounted within a tube holder by a laterally connecting pivot pins. A stake member is bolted to the holder for supporting of the device in the ground with the socket and rod extended outwardly. A coil spring is located between the socket and tube spring bias and the socket in a first direction within the tube holder. A battery system alarm signaling system is mounted within an inner extension of the tube holder with a fixed switch contact on the holder and a movable switch contact on the inner end of the socket. A special spring loading adjustment is provided for adjusting the necessary force on the socket member necessary to pivot the socket to close the contacts. When a fish bites on the cast line, the pull thereon is operative to pivot the socket within the fixed ground mounted tube holder, and upon a minimum sized bite closes the switch to energize the signaling device. Such signaling device thus alerts the fisherman to the fish bites. Many other similar cylindrical tubular devices and holders have been suggested, each of which operates basically in a similar manner to pivot a tubular holder to complete a contact connection and thereby actuating an alarm or an alerting device. Although many such alarm devices have been suggested, they include various relatively complex circuit connections and mounting components which make it difficult to produce an effective device at a reasonably low cost. This is particularly true because such devices must be adapted to all weather environments such as encountered in fishing, while being adjustable for responding to different weights and pulls which results from the variation in fishing rods and fish. Further, as the fishing rod support device is carried with other fishing gear, the device should be of a relatively rugged and compact construction in which the component parts are protected against significant mechanical damage.

SUMMARY OF THE PRESENT INVENTION

The present invention is particularly directed to an improved fishing rod holder apparatus having an integrated alerting means and which is of a rugged construction but permits low cost production while maintaining effective response to various fishing applications. Generally in accordance with the present invention, the fishing rod holder apparatus includes an outer cup-shaped body having a generally rectangular configuration having an internal wall defining an alert chamber to one side and a support chamber to the opposite side. A battery and alert unit is mounted in protected relationship in the alert chamber. A fish rod support member is located within the support chamber with an integrated leaf spring member connected to the bottom end of the support member and the support chamber, thereby defining a leaf spring mounting of the support member. The outer end of the support member is constructed to receive the handle end of a fishing rod. A contact operator is secured to the support member and extends laterally toward the separation wall into operative coupling to at least one contact member within the support chamber. In the normal relaxed position of the leaf spring, the contact member is held in a non-alert position. Selective pivoting of the support member actuates the contact member to actuate the alert unit. A mounting means such as a ground stake or rail mounting unit is removably coupled to the support body such as by a slotted connection for convenient mounting of the fishing rod holder.

More particularly in accordance with a particularly unique and practical embodiment of the present invention, the support member is tubular and socket which is connected to the body by a leaf spring as a single molded plastic unit. The integral plastic leaf spring member is cast to the underside or bottom of the socket and to the interior bottom wall of the body. The outer configuration of the holder includes a substantially rectangular portion defining the support chamber and an adjacent alert chamber having a reduced width and length to correspond to a usual battery chamber dry cell with inclined interconnecting integral molded walls providing a compact, esthetically pleasing outer housing. A leaf spring contact is secured within the bottom of the alert chamber and extends upwardly along the common separating wall, with the upper end extended outwardly into the support chamber. A battery support coil spring is located within bottom portion. The outer end of the alert chamber is adapted to be sealed by a cap having a covered opening for receiving and clamping of a small lamp in place with a center lamp contact located to contact a dry cell battery. A contact strip is secured to the lamp cap and extends into the support chamber with a depending arm portion overlapping the extension or arm portion of the first contact strip. The contact operator includes an arm connected to the socket and to the spring arm of the one of the contact strips such that pivoting of the socket moves the contact arm spring into engagement with the opposed contact arm. In a preferred embodiment, an audio signal generator is connected in parallel or series to provide simultaneous visual and sound alerts of a fish strike.

The common dividing wall defining the two chambers preferably includes an enlarged portion immediately adjacent the inner base portions. The enlargement includes a bottom opening to releasably receive the end of a mounting member, which may have an outer stake end for embedding in the ground or a channel-shaped bracket for mounting on a correspondingly shaped rail member or the like.

The integrated molded construction of the body, socket and spring support, as well as the simple spring contacts and the like, require a minimum number of components while producing a quickly and readily assembled fishing rod holder with the integrated alert means. The several basic features thus uniquely contribute to an economically producible fishing rod holder while maintaining the necessary ruggedness and reliability required by the environment encountered in fishing.

DESCRIPTION OF THE DRAWING FIGURES

The drawing furnished herewith illustrates a preferred construction of the present invention in which the above advantages and features are clearly disclosed as well as others which will be readily understood from the following description.

DESCRIPTION OF THE ILLUSTRATED EMBODIMENT

Figure 1:
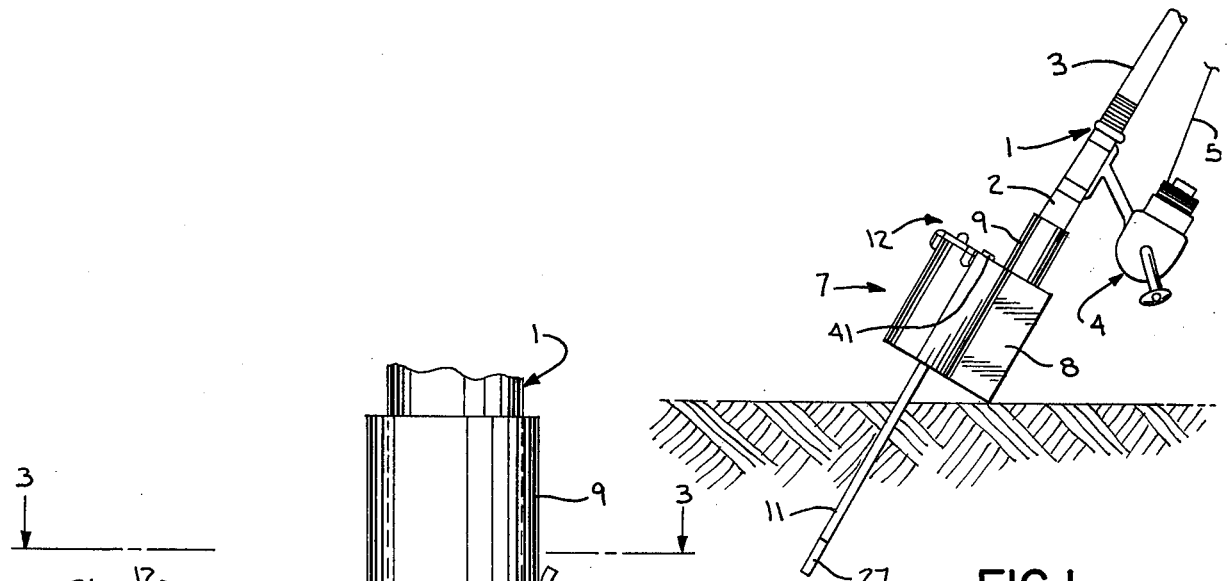
FIG. 1 is a side elevational view of an embodiment of a fishing rod holder constructed in accordance with the teaching of the present invention.

Referring to the drawing and particularly to FIG. 1, a fishing rod unit 1 is illustrated including an end handle 2 from which the rod 3 extends. A line reel 4 is secured to the fishing rod 3 immediately adjacent to the handle 2 with the fishing line 5 extended outwardly along the rod. The line 5 is cast or otherwise set outwardly to locate the hook and bait, not shown, in suitable relationship with a body of water, not shown. The handle 2 of the fishing rod 1 is located within a fishing rod holder 7 which is particularly constructed in accordance with the teaching of the present invention and illustrates a preferred embodiment of the invention. The holder 7 supports the fishing rod unit 1 in place without the necessity of the fisherman manually holding or supporting the rod. Generally, the fishing rod holder 7 includes a generally rectangular cup-shaped housing or body 8 having a handle receiving socket 9 for supporting the fishing rod unit 1. Socket 9 is mounted to body 8 by a leaf spring 10 to pivotally support the socket. A stake 11 is secured to the bottom of the fishing rod body 8 and is adapted to be embedded within the ground, for example, to support the fishing rod holder 7 and thereby the fishing rod unit 1 in position for fishing. The fishing rod holder 7 includes an alert unit 12 located laterally to one side of the socket 9. Switching contact arms 13 and 14 are located adjacent the socket 9 within body 8. A contact operator 15 is secured to the socket 9 and is operable in response to the pivotal movement of the socket 9 to engage and close the contact arms, thereby establishing energization of the alert unit 12.

Figure 2:
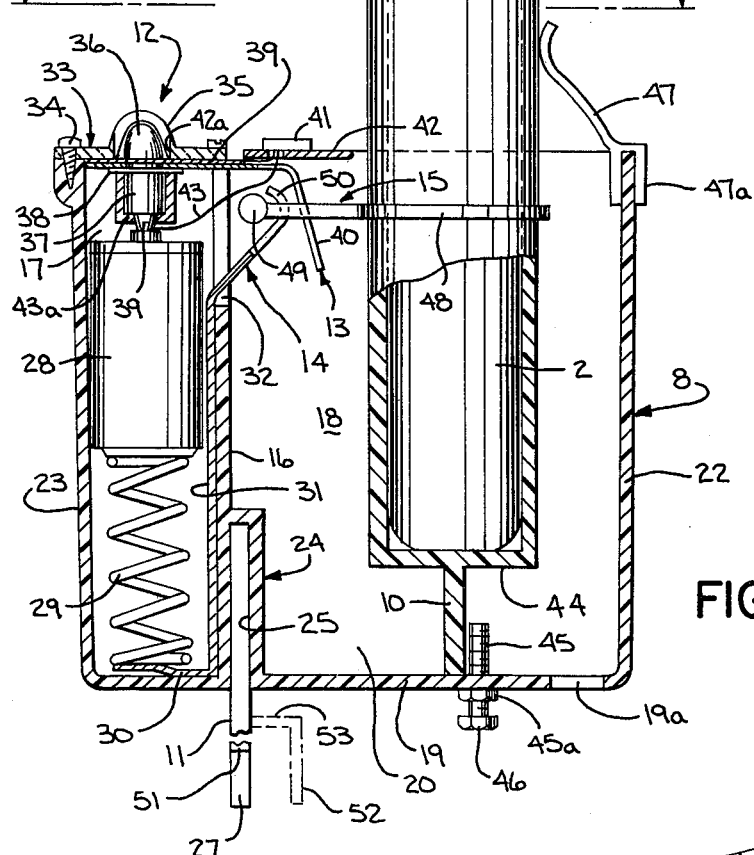
FIG. 2 is an enlarged longitudinal section through the fishing rod holder shown in FIG. 1.
Figure 3:
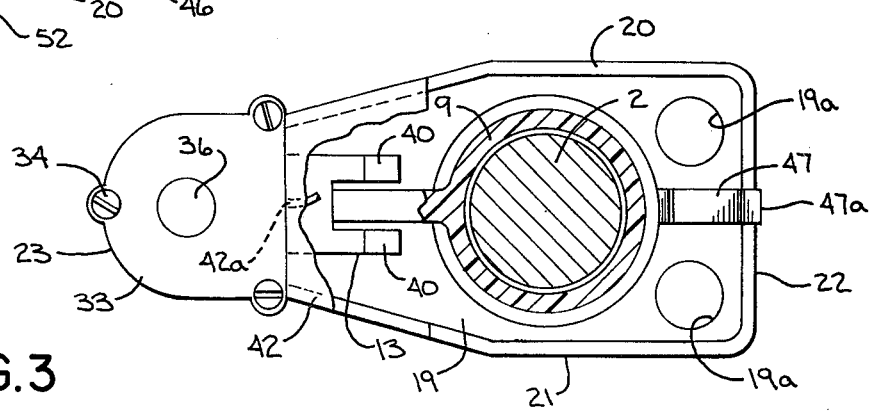
FIG. 3 is a horizontal section taken generally on line 3—3 of FIG. 2.

More particularly, as shown more clearly in FIGS. 2 and 3, the body 8 is a molded plastic member having a generally rectangular horizontal cross-section. An inner dividing wall 16 is integrally molded to define an alert chamber 17 for alert unit 12 and a support chamber 18 for the socket member 9.

The alert and support chambers 17 and 18 are thus located in side-by-side relationship longitudinally of the housing or body 8.

The socket 9 is located within the support chamber 18 with the leaf spring 10 molded to the bottom of socket 9 and to the bottom or base wall 19 of the body 8. The socket 9 is centrally located in chamber 18 and extends outwardly of the support chamber 18 to define an elongated tubular support adapted to receive the handle 2 of the pole unit 1 for firm reliable support thereof in the fishing position. The fishing rod unit 1 is thereby mounted by the leaf spring member 10 for pivotal movement along the major axis of the support chamber 18. The operator 15 of course moves in a corresponding direction and as the result of the pivotal movement. The operator 15 thereby moves the contact arms 13 and 14 to close the contact arms 13 and 14 and complete the circuit to the alert unit 12 thereby providing an indication of the strike.

More particularly, in the illustrated embodiment of the invention, the holder body 8 is formed of a molded plastic member with the several walls integrally cast to each other. The body 8 includes the bottom wall 19 having drain openings 19a and connected to upwardly standing parallel, spaced side walls 20–21 which are also connected to each other by opposite end walls 22 and 23 and to the common wall 16 to form a single integrally cast housing. The upper ends of the several outer walls 20–23 are formed in substantially common plane. The body 8 thus generally defines an opened top cup-shaped member having the two chambers 17 and 18 defined by and to the opposite sides of the common wall 16. A stake or a mounting support 24 is integrally cast within support chamber 18 against the common wall 16 with a bottom opening recess 25 to receive a correspondingly shaped end of the mounting member 11. In the illustrated embodiment of the invention, the mounting member 11 is shown in full as a simple steel stake having a rectangular cross-section corresponding to that of the recess 25. The stake 11 is releasably secured within opening 25 as by a pressure fit and extends outwardly of the bottom wall 19 with the outer end thereof pointed as at 27 for convenient driving into the ground. The stake 11 can be driven into the ground using a hammer or other member, after which the body 8 is located in position.

The alert chamber 17 in the illustrated embodiment of the invention is substantially smaller than the support chamber 18 and generally has a cross sectional configuration adapted to receive and hold a readily available dry cell battery, such as an illustrated D-sized battery 28. Although the system may obviously be adapted to a one or more batteries of any reasonably size, the D battery is readily available and inexpensive. The power requirements are minimal because the alert unit 12 is only activated in response to a strike and consequently the low cost D-battery is particularly suited for application to the present invention.

The end wall 23 is generally curved to merge with the side walls 20 and 21 to essentially correspond to the diameter and shape of the D-battery 28. The common wall 16 is spaced to cooperate with end wall 23 to laterally support the battery.

A battery coil spring 29 is located and secured within the inner or lower portion of the alert chamber 17. The upper end of the coil spring 29 is adapted to support the battery 28 and establish a common connection to the bottom end contact, similar to the connection in a conventional flashlight. Contact 14 is a leaf spring contact having a generally L-shaped portion located within the alert chamber 17 and having a bottom leg 30 connected to the bottom end turn of the coil spring 29 and a side leg 31 which extends upwardly along the common wall 16. The upper end of the L-shaped portion extends outwardly through an opening 32 in the common wall 16 to form the one contact of the contact means.

The upper end of the alert chamber 17 is sealed by a cap 33 which is attached to the upper end of the body 8 by a plurality of attachment screws 34. The upper end may be recessed in the area of cap 33 to locate the top in the top plane of body 8. The cap means is shown as a plastic member having a clear plastic central projection 35 generally corresponding to the bulb portion of a small battery operated lamp 36. The bulb portion is mounted within a cup-shaped base cap 37 having a flange 38 which forms one lead to the bulb. A central contact core 39 projects through an opening in the contact cap 37 in alignment with the central contact of the conventional square D-battery 28, as shown. The cap 33 engages the flange 38 and forces the lamp 36 downwardly into contact engagement with the battery with the spring 29 compressing to establish the resilient contact support as in a conventional flashlight.

The lamp contact cap 37 in turn is connected to the leaf spring contact 13 which is formed from a metal strap or strip secured to the under side of the between the flange 38 and cap 37, and thereby clamped in place by the connection of the cap 33 to the body 8. A seal member 39 may be located beneath the cap 33 to seal the chamber. A contact washer, not shown, may be located between the flange 38 and the contact 13 to increase the spring loading of the assembly and establish a firm electrical contact. Thus, contact 13 projects laterally along the top of the body 8 and includes a depending contact arm portion 40 depending into the support chamber 18 to the outer side of other alert contact member 32a. The alert system in addition to the visual alert may include an audible alert. Thus, as illustrated, a simple buzzer unit 41 may be mounted on a plate 42 and mounted in stacked relation to the lamp contact spring or plate 13 with a circuit lead 42a located between the plates to provide a common connection to one side of the buzzer. The opposite side of the buzzer is connected by an insulated lead 43 extending beneath plate 42 and into chamber 17, with the end shaped to engage the central battery contact in common with lamp contact 39. An insulating tube 43a may be placed over the lamp to separate the outer contact from lead 33. The buzzer support plate 42 is shown extended over the adjacent end of the support chamber 18 but may of course be located in any other suitable manner with respect to and into the support chamber. In the illustrated embodiment, the extended plate effectively covers the contacts and the entrance to the chamber 18.

The contacts 13 and 14 are actuated to simultaneously energize lamp 36 and buzzer 41 by the pivotal movement of the socket member 9 which is mounted within the support chamber 18 on the opposite side of the common wall 16. Chamber 18 is substantially larger than the alert chamber and is generally a rectangular chamber to accommodate the contact 13 and 14 and the pivotally mounted rod socket 9.

Thus, the illustrated socket 9 is constructed as a cylindrical member of a sufficient length to overlap the handle and firmly support the fishing pole unit 1. The socket 9 is formed with a bottom wall 44. The leaf spring 10 is a relatively thin plastic rib member of a width substantially corresponding to the diameter of the socket 9. The leaf spring is integral cast and molded with the socket bottom wall 44 and the body bottom 19 to define the pivotal mounting of the socket 9. The plane of the leaf spring 10 is perpendicular to the desired pivotal motion of the socket 9 and thus as shown, extends laterally across the socket chamber 9. The leaf spring 10 is located centrally of the socket chamber 9 and supports the socket spaced from the outer end wall 22 and the common wall 16, as well as the side walls 20 and 21. The leaf spring 10 and socket member 9 may thus pivot on the bottom wall 19 to the extent of the spacing from the end wall 22.

The force necessary to pivot the socket member 9 to the alert position is preferably made adjustable. In the illustrated embodiment of the invention, the flexibility of the leaf spring member 10 is controlled by an adjustable stop member 45 secured to the bottom wall 19 to the outside of the leaf spring 10. The axial positioning of the stop member varies the overlap and thereby the effective length of the leaf spring 10. The stop member 45 is essentially a rigid, non-flexible member and thereby the overlap varies flesible characteristic of the leaf spring. This results in a corresponding change and control of the pull on the fishing rod unit 1 necessary to pivot the socket 9 through any given distance. Thus, with stop member only slightly projecting into the chamber 18, the total length of the leaf spring is deflectable. This requires a relatively minimal force. As the stop member moves inwardly, a greater force is required to provide a corresponding deflection or pivoting of the socket 9.

In the illustrated embodiment of the invention, the stop member 45 is shown as a simple plastic screw member which threads through a suitable lock nut 45a secured to the outer side of the bottom wall 19. The outer end of the screw is provided with a knurled knob 46 to provide convenient manual adjustment. In the storage position, the screw 45 may be turned completely inwardly. The controlled pivotal movement of the socket 9 provides corresponding position of the switch operator 15. Alternately a simple leaf spring 47 may be secured to the outer end wall 22, as by a press-fitted clip 47a. The leaf spring 47 is bent inwardly into abutting engagement with socket 9 to establish a selected spring force in addition to that of the leaf spring member 10.

The switch operator 15 is shown including a mounting ring member 48 which slips over the socket member 9 and is firmly interfixed thereto as by a press set, a suitable adhesive, integral molding therewith or the like. The illustrated operator includes an outwardly extending arm which passes through aligned openings in contact members 13 and 14. The outer end of the operator arm includes a cross coupling bar 49. The innermost contact member 14, which is provided with a reversely curved end portion 50 aligned with the cross coupling bar 49. Thus, as the socket 9 pivots in response to a bite or the like, the cross coupling bar 49 engages and pulls contact 14 outwardly into firm engagement with the depending leg 40 of the contact 13. This completes the circuit through the lamp unit 36 and/or buzzer 41, thereby providing a corresponding alert to the fisherman that there is a bite.

As previously noted, although shown as a ground mounted unit, the mounting member may be replaced with a rail mounting member. For example, as shown in Fig. the outer end of the mounting member 11 may include a pair of parallel legs 51 and 52 interconnected by a cross brace 53 thereby defining a U-shaped support adapted to be placed over a connecting rail, such as on a boat, peer or other shore line support.

These and similar modifications to the structure can be readily provided by those skilled in the art and no further description is given herein.

The fish rod holder apparatus with the integrated alarm of the present invention may be formed with a minimum number of components and without the usual projecting contact wires, switches and the like.

The molded single piece construction of the body, socket, and leaf spring provides a convenient method of mass production and at a relatively low cost.

The present invention thus provides an improved and esthetically pleasing and all year around fishing rod holder apparatus which can be readily employed in the environment of both winter ice fishing and summer fishing. The structure is simple reliable and may be conveniently stored by separation of the mounting bracket from the body portion as such.

Various modes in carrying out the invention are contemplated as being within the scope of the following claims, particularly pointing out and distinctly claiming the subject matter which is regarded as the invention.

I claim:

1. A fishing rod holder apparatus for supporting a fishing rod with the line and hook in the water, comprising:
    a housing including an open top support chamber and an alert chamber secured to one side of said support chamber, an alert means located in said alert chamber and having a control element extended into said support chamber, a fish rod support socket member mounted in said support chamber and having a top opening adapted to receive the fishing rod,
    a spring support means secured between the bottom end of said socket member and the bottom end of said support chamber to define a cantilevered pivotally support of said socket member to the support chamber and within the support chamber for pivotal movement within said support chamber,
    alert operating means coupled to said socket member and connected to said alert control element and operable to activate said alert means,
    mounting means for mounting said holder apparatus to a support means, and
    said support chamber and alert chamber being formed in a single integral molded plastic body having an open top to both said chambers and a common separating wall defining said support chamber and said alert chamber, and said spring support means is a leaf spring member connected to a bottom wall of said socket member and to a bottom wall of said support chamber.

2. The fishing rod holder apparatus of claim 1 wherein a cap means is releasably secured in sealing relation to the top of said alert chamber and supporting said alert means.

3. The fishing rod holder apparatus of claim 1 wherein said housing includes said molded plastic body having a bottom wall connected to an encircling side wall means and said common internal wall connecting opposite sides of said side wall means and separating said body into said alert chamber and said support chamber to the opposite sides of said common internal wall, said alert chamber being substantially smaller than said support chamber and sized to support a dry cell battery means, said spring support means being an integrally connected plastic rib member secured to the bottom wall of the socket member and to the bottom wall of the body.

4. The fishing rod holder apparatus of claim 3 wherein said leaf spring rib member is integrally molded to said bottom wall of the body.

5. The apparatus of claim 4 wherein the alert operating means includes electrical contact means includes first and second contact members extending from said alert chamber into said support chamber, said first and second contact members being flexible self-supporting spring-like arm members biased to a first position and movable to a second position in response to a fish strike-related pivotally movement of said socket member.

6. The apparatus of claim 5 having a cap means releasably secured in sealing relation to the top of said alert chamber, said alert means attached to said cap means, said first contact member secured to said cap means in circuit connection to said alert device and projecting laterally into said support chamber.

7. The fishing rod holder apparatus of claim 1 wherein said housing includes said molded plastic body having a generally rectangular cup-shaped configuration with a bottom wall connected to opposed side walls and opposed end walls and said common separating wall connecting said side walls and separating said body into said alert chamber and said support chamber to the opposite sides of said common internal wall, said alert chamber being substantially smaller than said support chamber and sized to support a dry cell battery means,
    cap means releasably secured to the top of said body to seal said alert chamber, said cap means including a signal support and a contact means extending from said signal support laterally into said support chamber and including a depending contact arm,
    said socket member being a cylindrical tube adapted to receive the handle of a fishing rod and located in said support chamber, said spring support means being a leaf spring rib member,
    said alert operating means including a contact operator connected to said socket member and extending therefrom into coupling engagement with said alert control element and operable to activate the alert means in response to predetermined pivotal movement of the socket member.

8. A fishing rod holder apparatus of claim 7 wherein said leaf spring rib member is a plastic rib molded to the bottom portion of said socket member and to the bottom wall of said support chamber to pivotally support said socket member for pivotal movement within said support chamber.

9. The apparatus of claim 8 having a pivot adjustment means secured to said support chamber and movably into overlying position with said plastic rib to adjust the operative length of the leaf spring support means.

10. A fishing rod holder apparatus for supporting a fishing rod with the line and hook in the water, comprising:
    a housing including an open top support chamber and an alert support chamber secured to one side of said chamber, an alert means located in said alert chamber and having a control element extended into said support chamber, a fish rod support socket member mounted in said support chamber and having a top opening adapted to receive the fishing rod,
    a spring support means secured between the bottom portion of said socket member and said support chamber to pivotally support said socket member for pivotal movement within said support chamber,
    alert operating means coupled to said socket member and connected to said alert control element and operable to activate said alert means,
    mounting means for mounting said holder apparatus to a support means,
    said support chamber and alert chamber are formed in a single integral molded plastic body having a common separating wall defining said support chamber and said alert chamber, and said spring support is a leaf spring member connected to said socket member and said support chamber, a cap means releasably secured in sealing relation to the top of said alert chamber and supporting said alert means, and wherein said alert means including an electrically operated alert device, and having a contact member secured to said cap means and projecting laterally into said support chamber, said control element including a second contact member extending from said alert chamber into said support chamber, said first and second contact members being flexible self-supporting spring-like arm members biased to a first position and movable to a second position in response to a fish strike-related pivotally movement of said operating means and said socket member.

* * * * *